No. 730,152. PATENTED JUNE 2, 1903.
M. W. PITNER.
FABRIC TURFING MACHINE.
APPLICATION FILED DEC. 6, 1902.
NO MODEL.
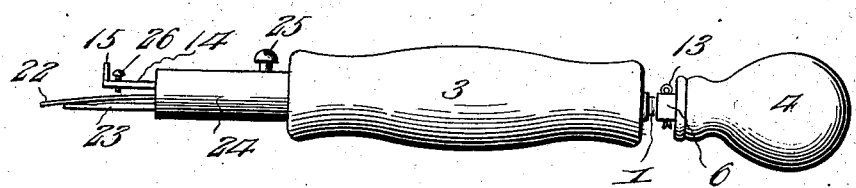
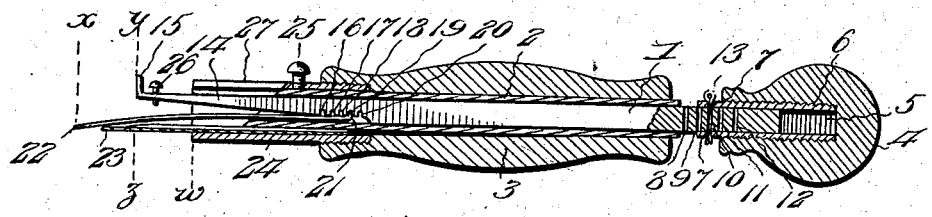
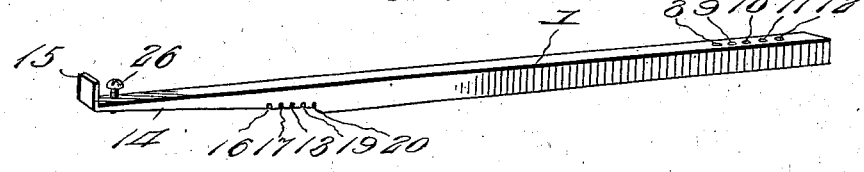
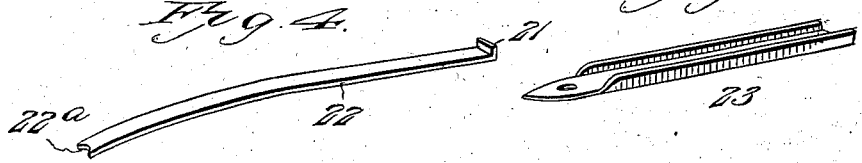
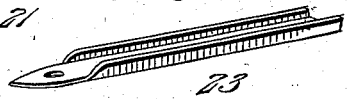
WITNESSES:
INVENTOR
Marion W. Pitner,
By Victor J. Evans
Attorney No. 730,152. Patented June 2, 1903.

UNITED STATES PATENT OFFICE.

MARION W. PITNER, OF CHICAGO, ILLINOIS.

FABRIC-TURFING MACHINE.

SPECIFICATION forming part of Letters Patent No. 730,152, dated June 2, 1903.

Application filed December 6, 1902. Serial No. 134,140. (No model.)

*To all whom it may concern:*

Be it known that I, MARION W. PITNER, a citizen of the United States, residing at Chicago, in the county of Cook and State of Illinois, have invented new and useful Improvements in Turfing-Machines, of which the following is a specification.

This invention relates to turfing machines or implements of that class comprising reciprocating elements and embodying a needle stitch-catcher and an operating bar or rod having means of a particular nature for adjusting the parts of the implement or machine for producing loops of various lengths in a simple and effective manner.

The primary object of the improved turfing implement or machine is to assemble in compact form the necessary elements for practically performing the turfing operation and reliably adjusting the several parts.

A further object of the invention is to produce a strong and durable turfing implement or machine at a minimum expense.

In the drawings, Figure 1 is a side elevation of a turfing implement embodying the features of the invention. Fig. 2 is a longitudinal vertical section of the same. Fig. 3 is a detail perspective view of the operating bar or rod. Fig. 4 is a detail perspective view of the stitch-catcher or looper. Fig. 5 is a detail perspective view of the needle.

Similar numerals of reference are employed to indicate corresponding parts in the several views.

The numeral 1 designates an operating rod or bar of angular form in cross-section to prevent it from having a rotary movement and surrounded by a guide-tube 2, over which is secured a handle or grip 3. The rod or bar 1 is considerably longer than the handle or grip 3, and adjustably mounted on the rear end thereof is a knob 4, with an angular opening 5, extending longitudinally thereinto, in which is fitted a metallic bushing 6, the knob being preferably formed of wood or other material of a light nature. The bushing 6 is projected from the front end of the knob 4 and has vertically-alined openings 7 therein to coincide with a series of openings 8, 9, 10, 11, and 12 in the rod or bar 1, the knob 4 being held in immovable relation to the rod or bar by a pin 13, which is inserted through the openings 7 in the bushing 6 and either one of the openings 8, 9, 10, 11, or 12. The front extremity of the rod or bar 1 is formed with an upwardly-inclined face 14 to reduce the thickness of or gradually taper the extremity of the said rod or bar, and the said reduced extremity of the rod or bar terminates in an angular foot 15. The upwardly-inclined face 14 terminates at the rear adjacent to a series of slots 16, 17, 18, 19, and 20. The slots just described correspond in number to the openings 8, 9, 10, 11, and 12, and any one of the same is adapted to be engaged by the rear angular terminal 21 of a longitudinally-convex stitch-catcher or looper 22, which is loosely held between the slotted part of the face 14 of the rod or bar 1 and the forward extremity of the tube 2, the catcher or looper also operating between the said extremity of the tube and a needle held in the latter. A sleeve 24 is attached to the front extremity of the handle or grip 3, and therethrough the foregoing parts project and operate. The stitch-catcher or looper is slidable longitudinally in relation to the needle, and the latter has opposite side flanges to hold the fabric apart to form an opening for the catcher or looper and prevent the latter from catching on the fabric, and the catcher is maintained in positive longitudinal alinement in relation to the rod or bar 1 by its disposition in the angular tube, and after the parts are assembled as set forth the needle 23 is firmly held in the sleeve 24 by a screw 25 in the upper side of the sleeve 24, which is brought to bear against the adjacent portion of the tube 2. The stitch-catcher or looper 22 being longitudinally convex or bent, the outer end only bears against the needle, and the rear angular terminal of the catcher or looper is thus also held in one of the slots 16, 17, 18, 19, or 20, whereby accidental separation of the catcher or looper will be prevented. Longitudinal adjustment of the catcher or looper 22 may be obtained at any time by removing the knob 4 and pushing the rod or bar forward until the catcher or looper is forced out of the tube 2, and by disengaging the rear angular terminal 21 from one of the slots in the forward extremity of the rod or bar 1 and placing it in another slot will cause a variation of the loops formed in the turfing operation when a corresponding adjustment of the knob 4 is made on the rod or bar 1. When the rear angular terminal of the catcher or looper 22 is in engagement with the slot 16 and the bushing 6 is held by the pin 13, secured through the use of the opening 12, the longest loop can be made and shorter loops produced successively by engagement of the slots 17, 18, 19, and 20 and the openings 11, 10, 9, and 8.

By positioning the adjusting means at two points in the length of the rod or bar 1 and spacing said means apart for respective engagement by an operating-knob applied to the rear end of the bar and a stitch-catcher or looper in connection with the front extremity of the rod or bar a greater range of adjustment is obtained with convenience to the operator and without requiring a withdrawal of the rod or bar from the handle to render the adjusting means of the stitch-catcher or looper accessible when it is desired to modify the length of loop formed during the turfing operation. By having the knob adjustably applied on the rear end of the rod or bar the distance between the front end of the knob and the adjacent end of the handle may be varied relatively to a maximum stroke, and the projection of the free end of the catcher or looper beyond the end of the needle can thus be changed without adjusting the needle or the said catcher or looper. Another advantage of this separation of the adjusting means on the rod or bar is that if the combined extent of said means was positioned at one point on the bar—for instance, at the front extremity—the catcher or looper would have to be of abnormal length to arrive at the range of adjustment permitted by the use of a comparatively short catcher or looper, as shown, and the two separate means of adjustment.

The stitch-catcher or looper 22 is resilient and has a concave seat 22ª at its front extremity, and to control the lateral adjustment or movement of the said stitch-catcher or looper to regulate the spaced distance of the loops formed an adjusting-screw 26 is movably mounted in the front reduced extremity of the rod or bar 1 close to the foot 15. It will be seen that a projection or retraction of the said screw 26 relatively to the catcher or looper 22 will correspondingly decrease and increase the movement of the said catcher or looper relatively to the needle 23. The sleeve 24 is formed with a slot 27 to permit the foot of the rod or bar and the screw 26 to slide back until the end of the sleeve forces the catcher or looper to disengage from the fabric, when the latter then springs back into the needle. To render the device effective, the distance from the end of the catcher or looper, as indicated by the dotted line $x$, and the foot 15, as shown by dotted line $y$, and the distance between the rear terminal of the needle-eye and the front end of the sleeve 24, respectively indicated by the dotted lines $z$ and $w$, must be the same, and this uniformity in distance between the points stated can be obtained through the use of the adjusting-screw 25.

The improved device operates similarly to turfing-machines now in use, and in preparing the device for turfing the knob is drawn rearward until the foot of the rod or bar and the catcher or looper are back of the front end of the sleeve. The needle is put through the cloth or fabric until the front end of the sleeve bears against the latter. Then the rod or bar is pushed forward until its foot comes in contact with the cloth, and the needle is then drawn out and moved over to the cloth and again put through the latter at another point. The stitch-catcher or looper holds the successively-formed loops during such operations of the needle. It will be readily understood by those skilled in the art that the loops formed are cut and otherwise treated and employed to complete the turfing operation to arrive at the result sought, and hence such operation need not be herein referred to in detail. In the several steps of forming the loops the catcher or looper 22 holds the individual loops while the needle is making a successive loop, and thereby the several loops will be produced in equal length, in accordance with the adjustment of the said catcher or looper and the knob 4. Different sizes of needles will be provided to work looping material varying in dimensions from a single thread to rags one inch wide or more. It will also be seen that when the catcher or looper is in engagement with one of the slots at the forward extremity of the rod or bar inside of the tube and the knob is secured in place the catcher or looper cannot become accidentally released.

Having thus fully described the invention, what is claimed as new is—

1. In a turfing implement, the combination of a rod having a series of openings through the rear extremity and a corresponding series of slots in the lower portion of the front extremity, the front extremity of the rod having an inclined face and terminating in an angular foot, a needle held in operative relation to the front extremity of the rod, a loop-catcher having its rear terminal adjustably engaging the said slots, an actuating-knob adjustably held in relation to the openings of the rod, and means for limiting the lateral movement of the catcher in relation to the front extremity of the rod.

2. A turfing implement comprising a reciprocable rod, an actuating-knob adjustably attached to the rear extremity of the said rod, a yielding loop-catcher adjustably attached to the front extremity of the said rod, and a handle carrying a collar having a needle clamped therein.

3. A turfing implement comprising a reciprocable rod, having an actuating-knob adjustably connected to the rear extremity thereof, a yielding loop-catcher adjustably held by the front extremity of said rod, a handle through which said rod has movement and having means for holding a needle, and a needle mounted in the said means and adjustable in relation to the remaining parts.

4. A turfing implement, comprising a reciprocable rod having a knob adjustably connected to its rear extremity, and a loop-catcher adjustably applied to its front extremity, an adjusting device in the front extremity of the rod to regulate the lateral movement of the loop-catcher, a handle through which said rod has movement, and provided with a front holding element, and a needle adjustably held in said element in operative relation to the loop-catcher.

In testimony whereof I affix my signature in presence of two witnesses.

MARION W. PITNER.

Witnesses:
BENJ. F. WEBB,
E. J. COHN.